(12) United States Patent
Chae et al.

(10) Patent No.: US 9,030,620 B2
(45) Date of Patent: May 12, 2015

(54) DISPLAY PANEL AND METHOD OF MANUFACTURING THE SAME

(71) Applicant: Samsung Display Co., Ltd., Yongin, Gyeonggi-Do (KR)

(72) Inventors: Seung-Yeon Chae, Hwaseong-si (KR); Sang-Gun Choi, Suwon-si (KR); A-Ram Lee, Hwaseong-si (KR); Tae-Woon Cha, Seoul (KR)

(73) Assignee: Samsung Display Co., Ltd. (KR)

( * ) Notice: Subject to any disclaimer, the term of this patent is extended or adjusted under 35 U.S.C. 154(b) by 53 days.

(21) Appl. No.: 14/057,185

(22) Filed: Oct. 18, 2013

(65) Prior Publication Data

US 2014/0368770 A1    Dec. 18, 2014

(30) Foreign Application Priority Data

Jun. 14, 2013    (KR) .......................... 10-2013-0068194

(51) Int. Cl.
*G02F 1/136* (2006.01)
*G02F 1/1335* (2006.01)
*G02F 1/1333* (2006.01)

(52) U.S. Cl.
CPC .... *G02F 1/133514* (2013.01); *G02F 1/133512* (2013.01); *G02F 1/133528* (2013.01)

(58) Field of Classification Search
CPC ................... G02F 1/136209; G02F 1/133512; G02F 1/136227; G02F 1/136213; G02F 1/36286; G02F 1/133514; G02F 1/133516; G02F 1/133371; G02F 1/33345

USPC ............................................... 349/44, 106, 84
See application file for complete search history.

(56) References Cited

U.S. PATENT DOCUMENTS

| | | | | |
|---|---|---|---|---|
| 2010/0059754 A1* | 3/2010 | Lee et al. | ......................... | 257/59 |
| 2013/0329169 A1* | 12/2013 | Kim et al. | ....................... | 349/96 |
| 2014/0028925 A1* | 1/2014 | Choi et al. | ...................... | 349/12 |
| 2014/0285742 A1* | 9/2014 | Kim et al. | ....................... | 349/43 |

FOREIGN PATENT DOCUMENTS

| | | |
|---|---|---|
| JP | 2005-078869 A | 3/2005 |
| JP | 2009-096884 A | 5/2009 |
| KR | 100781690 B1 | 11/2007 |
| KR | 100973644 B1 | 7/2010 |
| KR | 1020120067288 A | 6/2012 |
| KR | 1020120072949 A | 7/2012 |
| KR | 1020120072950 A | 7/2012 |

* cited by examiner

*Primary Examiner* — Mike Qi
(74) *Attorney, Agent, or Firm* — Cantor Colburn LLP (57) ABSTRACT

A display panel includes a substrate including a plurality of thin-film transistors thereon, a plurality of gate lines respectively connected to a thin film transistor and disposed on the substrate, a color filter layer disposed on the substrate and the gate lines, a black matrix disposed on the color filter and overlapped with the gate lines, and a hole defined in the black matrix and exposing the color filter layer, a first electrode disposed on the color filter and electrically connected to the thin-film transistor and an image displaying layer disposed on the first electrode.

20 Claims, 8 Drawing Sheets

DISPLAY PANEL AND METHOD OF MANUFACTURING THE SAME

This application claims priority to Korean Patent Application No. 10-2013-0068194, filed on Jun. 14, 2013, and all the benefits accruing therefrom under 35 U.S.C. §119, the disclosure of which is incorporated by reference herein in its entirety.

BACKGROUND (1) Field

Exemplary embodiments of the invention relate to a display panel and a method of manufacturing the same, and more particularly, to a display panel including one base substrate and a method of manufacturing the same.

(2) Description of the Related Art

A display panel includes an array substrate, a color filter substrate, and a liquid crystal layer disposed between the array substrate and the color filter substrate. The array substrate includes switching elements, and the color filter substrate includes color filters disposed therein. The array substrate includes a first base substrate and the color filter substrate includes a second base substrate, thus resulting in a relatively high manufacturing cost since the display panel includes two base substrates.

An embedded micro-cavity ("EM") display panel includes switching elements and color filters on one base substrate.

SUMMARY

One or more exemplary embodiment provides a display panel capable of maintaining an aperture ratio and decreasing poor-performing pixels.

One or more exemplary embodiment also provides a method of manufacturing the above-mentioned display panel.

In accordance with an exemplary embodiment of the invention, a display panel includes a substrate, a plurality of gate lines, a color filter layer, a black matrix, a first electrode and an image displaying layer.

The substrate includes a plurality of thin-film transistors disposed thereon. The gate lines are disposed on the substrate and respectively connected to a thin film transistor. The color filter layer is disposed on the gate lines and on the substrate. The black matrix is disposed on the color filter layer and overlaps the gate lines, and a hole is defined in the black matrix and exposes the color filter layer. The first electrode is disposed on the color filter layer and electrically connected to the thin-film transistor. The image displaying layer is disposed on the first electrode.

In an exemplary embodiment of the invention, the display panel may further include a first insulation layer covering the black matrix and the first electrode, and exposing the hole defined in the black matrix.

In an exemplary embodiment of the invention, the display panel may further include a second insulation layer disposed on the image displaying layer and a second electrode disposed on the second insulation layer and insulated from the first electrode.

In an exemplary embodiment of the invention, the first insulation layer and the second insulation layer may include an organic insulation material.

In an exemplary embodiment of the invention, the display panel may further include a protection layer disposed on the second electrode, and surrounding a portion of an upper surface and a side surface of the image displaying layer.

In an exemplary embodiment of the invention, the display panel may further include an upper polarizer disposed on an upper surface of the protection layer, and a lower polarizer disposed on a lower surface of the substrate.

In an exemplary embodiment of the invention, the hole defined in the black matrix may be arranged between the gate lines.

In an exemplary embodiment of the invention, the hole defined in the black matrix may have a tetragonal shape.

In an exemplary embodiment of the invention, a length of the hole may be about 5 micrometers (μm) to about 15 μm, and a width of the hole may be about 5 μm to about 15 μm.

In an exemplary embodiment of the invention, a cross-sectional thickness of an area of the color filter layer overlapping the hole defined in the black matrix may be smaller than a cross-sectional thickness of another area of the color filter layer.

In an exemplary embodiment of the invention, the image displaying layer may include a liquid crystal layer and an alignment layer. The liquid crystal layer may have a liquid crystal. The alignment layer may be disposed between the first insulation layer and the liquid crystal layer. The alignment layer may be disposed between the second insulation layer and the liquid crystal layer.

In accordance with an exemplary embodiment of the invention, a method of manufacturing of a display panel is provided. A substrate including a plurality of thin-film transistors disposed thereon, and a plurality of gate lines disposed thereon and respectively connected to a thin-film transistor is provided. A color filter layer is formed on the substrate. The color filter layer is exposed to light. A black matrix is formed on the color filter layer. The black matrix overlaps the gate lines. A hole is defined in the black matrix and exposes the color filter layer.

In an exemplary embodiment of the invention, a first electrode may be further formed on the color filter layer.

In an exemplary embodiment of the invention, a first insulation layer may be further formed covering the black matrix and the first electrode. The insulation layer may be exposed with light such that the first insulation layer exposes the hole defined in the black matrix.

In an exemplary embodiment of the invention, after the first insulation layer exposed, a sacrificial layer may be formed on the first insulation layer by coating a photoresist composition. A second insulation layer may be formed on the sacrificial layer. A second electrode may be formed on the second insulation layer. The sacrificial layer may be removed by a developer to form a space. An image displaying layer may be formed in the space from which the sacrificial layer removed.

In an exemplary embodiment of the invention, a developer injection hole may be formed to expose to sacrificial layer, before the sacrificial layer removed. A photoresist composition may be coated on the second electrode. An exposed portion of the second insulation layer may be etched using the photoresist composition as a mask to expose the sacrificial layer.

In an exemplary embodiment of the invention, the image displaying layer may be formed. An alignment layer may be formed in the space from which the sacrificial layer is removed. A liquid crystal may be injected into the space including the alignment layer formed therein.

In an exemplary embodiment of the invention, a protection layer may be formed. The protection layer may be disposed on the second electrode, and surrounding a portion of an upper surface and a side surface of the image displaying layer.

In an exemplary embodiment of the invention, the first insulation layer includes an organic insulation material.

In an exemplary embodiment of the invention, the hole defined in the black matrix has a tetragonal shape, and a length of the hole is about 5 μm to about 15 μm, and a width of the hole is about 5 μm to about 15 μm.

In accordance with one or more exemplary embodiment of the invention, a display panel and a method of manufacturing the same include the black matrix overlapped with the gate lines, and the hole in the black matrix exposes the color filter layer, so that an aperture ratio of the display panel may be maintained and poor performing pixels may be decreased.

BRIEF DESCRIPTION OF THE DRAWINGS

The disclosure will become more apparent by describing in detailed exemplary embodiments thereof with reference to the accompanying drawings, in which.

DETAILED DESCRIPTION

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. In the drawings, the size and relative sizes of layers and regions may be exaggerated for clarity.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

During a liquid crystal dropping process in forming a display panel, a gas is generated from a color filter photoresist, so that problems such as a dropping spot and an active unfilled area ("AUA") deterioration may occur. Furthermore, in forming the display panel, a particular hole may be defined in the color filter layer in a pixel area by etching an electrode and an organic layer. However, in order to reduce or effectively prevent a light leakage by the hole, a black matrix corresponding to the hole is included in the display panel. Therefore, an aperture ratio may be decreased by the black matrix. Therefore, there remains a need for an improved display panel and manufacturing method thereof, which reduce or effectively prevent occurrence of problems such as a dropping spot and an AUA and have an increased aperture ratio.

Hereinafter, exemplary embodiments will be described in detail with reference to the accompanying drawings.

Figure 1:
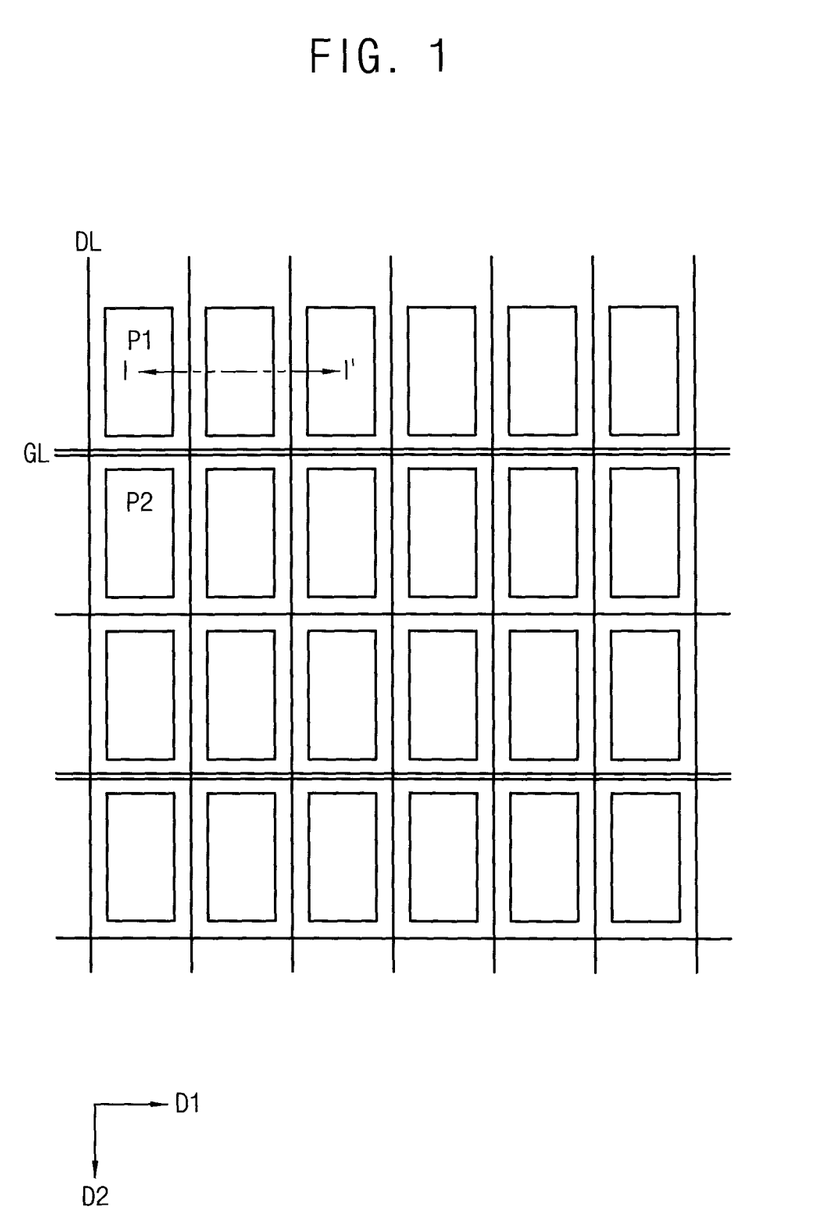
FIG. 1 is a plan view illustrating an exemplary embodiment of a display panel in accordance with the invention.

FIG. 1 is a plan view illustrating an exemplary embodiment of a display panel in accordance with the invention.

Referring to FIG. 1, a display panel includes a plurality of gate lines GL, a plurality of data lines DL and a plurality of pixels P1, P2, etc.

The gate lines GL may extend in a first direction D1. The data lines DL may extend in a second direction substantially perpendicular to the first direction D1. Alternatively, the gate lines GL may extend in the second direction D2 and the data lines DL may extend in the first direction D1.

The pixels may be arranged in a matrix shape. In one exemplary embodiment, the pixels may be disposed in areas defined by the gate lines GL and the data lines DL, but the invention is not limited thereto.

Each pixel may be connected to a corresponding gate line GL and a corresponding data line DL adjacent to the pixel but the invention is not limited thereto.

Each pixel may have a rectangle planar shape elongated in the second direction D2. Alternatively, the pixel may have a V-shape, a Z-shape, etc.

A structure of a pixel will be described in detail with reference to FIGS. 2 and 3.

Figure 2:
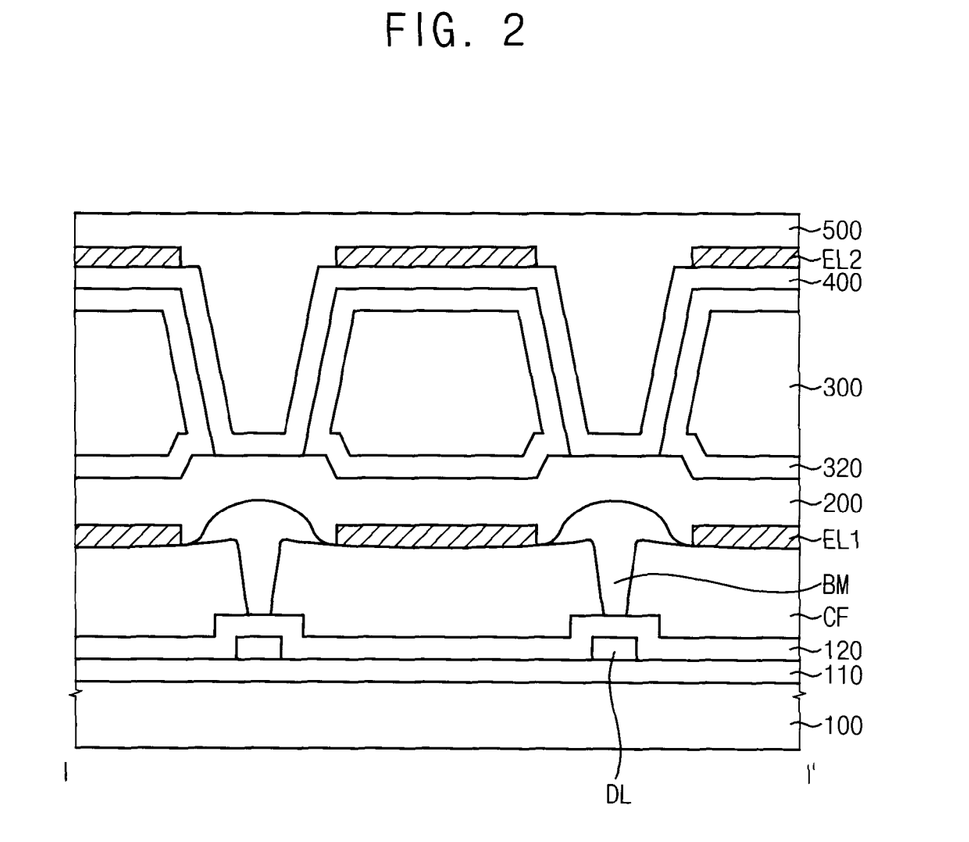
FIG. 2 is a cross-sectional view taken along line I-I' in FIG. 1.

FIG. 2 is a cross-sectional view taken along line I-I' in FIG. 1. FIG. 3 is a plan view illustrating an exemplary embodiment of a first pixel and a second pixel in the display panel in FIG. 1. FIG. 4 is a cross-sectional view taken along line II-II' in FIG. 3.

Referring to FIGS. 1 to 4, the display panel includes a base substrate 100, a plurality of thin film transistors TFT, a gate insulation layer 110, a data insulation layer 120, a color filter layer CF, a black matrix BM, a first electrode EL1, a first insulation layer 200, an image displaying layer 300, an alignment layer 320, a second insulation layer 400, a second electrode EL2 and a protection layer 500.

The base substrate 100 may be a transparent insulation substrate. Examples of the transparent insulation substrate may be, but are not limited to, a glass substrate, a quartz substrate, a plastic substrate, etc. The base substrate 100 may include a plurality of pixel areas for displaying an image. A plurality of the pixel areas may be disposed in a matrix shape having a plurality of rows and a plurality of columns.

Each pixel may further include a switching element. In one exemplary embodiment, for example, the switching element may be a thin film transistor TFT. The switching element may be connected to a corresponding gate line GL and a corresponding data line DL adjacent to the switching element. The switching element may be disposed at a crossing area of the gate line GL and the data line DL, but the invention is not limited thereto.

A gate pattern may include a gate electrode GE and the gate line GL. The gate pattern may be disposed on the base substrate 100. The gate line GL is physically and/or electrically connected to the gate electrode GE.

The gate insulation layer 110 may be disposed on the base substrate 100 to cover the gate pattern and may insulate the gate pattern from other elements of the display panel.

A semiconductor pattern SM may be disposed on the gate insulation layer 110. The semiconductor pattern SM may overlap the gate electrode GE.

A data pattern may include the data line DL, a source electrode SE and a drain electrode DE. The data pattern may be disposed on the semiconductor pattern SM, which is disposed on the gate insulation layer 110. The source electrode SE may overlap the semiconductor pattern SM. The source electrode SE may be physically and/or electrically connected to the data line DL.

The drain electrode DE may be spaced apart from the source electrode SE with respect to the semiconductor pattern SM, and may expose a portion of the semiconductor pattern SM. The semiconductor pattern SM may have a conductive channel between the source electrode SE and the drain electrode DE. The exposed portion of the semiconductor pattern SM may form the conductive channel.

The thin film transistor TFT may include the gate electrode GE, the source electrode SE, the drain electrode DE and the semiconductor pattern SM.

The data insulation layer 120 may be disposed on the gate insulation layer 110. The data insulation layer 120 may insulate the data pattern from other elements of the display panel.

The gate line GL, the data line DL and the switching element may be disposed on the gate insulation layer 110. The switching element may include the gate electrode GE, the gate insulation layer 110, the semiconductor pattern SM, the source electrode SE and the drain electrode DE. The gate insulation layer 110 may be disposed on a whole surface of the base substrate 100.

The gate insulation layer 110 may include an organic insulation material or an inorganic insulation material. In one exemplary embodiment, for example, the data insulation layer 120 may include benzocyclobutene polymer, olefin polymer, polyimide polymer, acryl polymer, polyvinyl polymer, siloxane polymer, silicon polymer, etc.

The data insulation layer 120 may be disposed on the gate line GL, the data line DL and the switching element. The data insulation layer 120 may be disposed on a whole surface of the base substrate 100. The data insulation layer 120 may include an organic insulation material or an inorganic insulation material. In one exemplary embodiment, for example, the data insulation layer 120 may include benzocyclobutene polymer, olefin polymer, polyimide polymer, acryl polymer, polyvinyl polymer, siloxane polymer, silicon polymer, etc.

The color filter layer CF and the black matrix BM may be disposed on the data insulation layer 120.

The color filter layer CF may be disposed on the data insulation layer 120.

The color of light may be changed by the color filter layer CF and the light may penetrate the image displaying layer 300. Color filters of the color filter layer CF may include a red color filter, green color filter and a blue color filter. Each color filter may correspond to one of the pixel areas. Color filters, which are adjacent to each other, may have different colors from each other. In an exemplary embodiment of the invention, the color filters of the color filter layer CF may be spaced apart from each other at a border between pixel areas adjacent to each other. That is, the color filters of the color filter layer CF may be disposed in a discrete island shape. Alternatively, color filters adjacent to each other may partially overlap each other at the border between pixel areas adjacent to each other.

Alternatively, in an exemplary embodiment of the invention, the color filters of the color filter layer CF may be disposed in a trench part TR. The trench part TR may be extended in a same direction of the gate lines GL, that is, may be disposed in a second direction D2 of the trench part TR. In the illustrated exemplary embodiment, the second direction D2 is perpendicular to the first direction D1, but the invention is not limited thereto.

A cross-sectional thickness of an area of the color filter layer CF on which the black matrix is disposed is smaller than a thickness of another area of the color filter layer CF. A cross-sectional thickness of an area of the color filter layer CF adjacent to the gate lines GL is smaller than a thickness of another area of the color filter layer CF.

Thus, a gap generated by the black matrix BM may be decreased.

In an exemplary embodiment of a method of forming (e.g., providing) a display panel, the color filter layer CF may be patterned by a halftone mask process or a slit mask process. Thus, the cross-sectional thickness of the area of the color filter layer CF adjacent to the gate lines GL may be formed to be smaller than a thickness of another area of the color filter layer CF.

The halftone mask may include a blocking area, a non-blocking area and a transflective area (not illustrated in the figures). The blocking area may have a light blocking pattern. The non-blocking area may not have a light blocking pattern. The transflective area may have a transflective pattern to decrease an amount of transmitted light. The halftone mask may be aligned on a color filter material layer for forming the color filter layer CF, and then, light may be irradiated onto the halftone mask.

Accordingly, while light to the blocking area may be blocked by the light blocking pattern, light to the non-blocking area may pass through the halftone mask. The transflective area having the transflective pattern may decrease an amount of the transmitted light.

The color filter material layer exposed by the halftone mask may be developed by a developer to form a patterned color filter layer CF.

The blocking area of the halftone mask may include chromium Cr or chromium oxide. The transflective area of the halftone mask may include substantially the same material as the blocking area. The transflective area of the halftone mask may include a slit. The transflective area may include one selected from CrxOy, CrxCoy, CrxCoyNz, SizNy, etc. The one selected from CrxOy, CrxCoy, CrxCoyNz, SizNy, etc. may be disposed on a transparent substrate of the halftone mask. Herein, x, y and z are a positive integer.

A cross-sectional thickness of the color filter layer CF may be controlled by the blocking area, the non-blocking area and the transflective area of the halftone mask.

The slit mask may include a blocking area having a light blocking pattern and a slit area having a slit pattern (not illustrated in the figures). The slit mask may be aligned on the color filter material layer for forming the color filter layer CF, and then, light may be irradiated onto the slit mask.

The blocking pattern and the slit pattern may include chromium Cr or chromium oxide. Accordingly, while light to the blocking area may be blocked by the light blocking pattern, light to the slit area may pass through the slit pattern to expose the color filter material layer for forming the color filter layer CF.

Then, the color filter material for forming the color filter layer CF exposed by the slit mask may be developed by a developer to form a patterned color filter layer CF.

The patterns of the color filter layer CF may be spaced apart by a predetermined interval. Alternatively, the slit pattern may have various types of slit pattern, so that the color filter layer CF may have various shapes. That is, the slit pattern may be disposed to have a relatively narrow slit pattern to transmit light. Alternatively, the slit pattern may be disposed to have a relatively wide slit pattern to thereby transmit plenty of light.

A shape and a thickness of the color filter layer CF may be controlled by the blocking area and the slit area of the slit mask.

The display panel may include signal lines and the black matrix BM. The signal lines may be connected to the thin film transistors TFT. The black matrix BM may overlap the signal lines and may block light.

The black matrix BM may be disposed on an area where the gate line GL, the data line DL and the switching element are disposed. The black matrix BM may include chromium Cr or chromium oxide.

The black matrix BM may be disposed on the color filter layer CF. The black matrix BM may be overlapped with a plurality of the gate lines GL extending to a first direction D1, to thereby block a light. A hole H (see FIG. 4) may be defined in the black matrix BM disposed between adjacent gate lines GL. Alternatively, the black matrix BM may be disposed on a non-display area of the pixel area. The smaller thickness area of the color filter layer CF may overlap the hole H defined in the black matrix BM.

In an exemplary embodiment of a method of forming (e.g., providing) a display panel, the hole H defined in the black matrix BM may be formed by depositing a black matrix material, irradiating a light using a mask and etching the black matrix material by a dry etch process or a wet etch process.

The black matrix BM may be patterned by a halftone mask process or a slit mask process. Thus, the hole H in the black matrix BM may be disposed between the adjacent gate lines GL, as illustrated in FIG. 4.

The halftone mask may include a blocking area, a non-blocking area and a transflective area (not illustrated in the figures). The blocking area may have a light blocking pattern. The non-blocking area may not have a light blocking pattern. The transflective area may have a transflective pattern to decrease an amount of transmitted light. The halftone mask may be aligned on a layer of the black matrix material for forming the black matrix BM, and then, light may be irradiated onto the halftone mask.

Accordingly, while light to the blocking area may be blocked by the light blocking pattern, light to the non-blocking area may pass through the halftone mask. The transflective area having the transflective pattern may decrease an amount of the transmitted light.

The black matrix material exposed by the halftone mask may be developed by a developer to form a patterned black matrix BM.

The blocking area of the halftone mask may include chromium Cr or chromium oxide. The transflective area of the halftone mask may include substantially the same material as the blocking area. The transflective area may include a slit. The transflective area may include one selected from CrxOy, CrxCoy, CrxCoyNz, SizNy, etc. The one selected from CrxOy, CrxCoy, CrxCoyNz, SizNy, etc. may be disposed on a transparent substrate of the halftone mask. Herein, x, y and z are a positive integer.

A cross-sectional thickness of the black matrix BM may be controlled by the blocking area, the non-blocking area and the transflective area of the halftone mask.

The slit mask may include a blocking area having a light blocking pattern and a slit area having a slit pattern (not illustrated in the figures). The slit mask may be aligned on the black matrix material for forming the black matrix BM, and then, light may be irradiated onto the slit mask.

The blocking pattern and the slit pattern may include chromium Cr or chromium oxide. Accordingly, while light to the blocking area may be blocked by the light blocking pattern, light to the slit area may pass through the slit pattern to expose the black matrix BM.

Then, the black matrix material exposed by the slit mask may be developed by a developer to form a patterned black matrix BM.

The patterns may be spaced apart by a predetermined interval. Alternatively, the slit pattern may have various types of slit pattern, so that the black matrix BM may have various shapes. That is, the slit pattern may be disposed to have a relatively narrow slit pattern to transmit light. Alternatively, the slit pattern may be disposed to have a relatively wide slit pattern to thereby transmit plenty of light.

A shape and a cross-sectional thickness of the black matrix BM may be controlled by the blocking area and the slit area of the slit mask.

The hole H defined in the black matrix BM may have various shapes. In one exemplary embodiment, for example, the hole H may be formed in a tetragonal-shape.

In one exemplary embodiment, for example, a length of the hole is about 5 micrometers (μm) to about 15 μm, and a width of the hole is about 5 μm to about 15 μm. The length and the width are planar dimensions and may be taken in the first and second directions D1 and D2.

Holes may be defined in the color filter layer CF and the black matrix BM, so that during forming the color filter layer CF, a gas generated from a color filter photoresist material for forming the color filter layer CF may be released by the holes.

In accordance with an exemplary embodiment of the invention, the display panel has a structure such as a color filter on array ("COA") structure and a black matrix on array ("BOA") structure. In the COA structure, the color filter layer is disposed on a lower surface of the image displaying layer 300. In the BOA structure, the black matrix is disposed on a lower surface of the image displaying layer 300. Alternatively, the color filter layer or the black matrix may be disposed on an upper surface of the liquid crystal layer.

The first electrode EL1 may be disposed on the color filter layer CF. The first electrode EL1 may be disposed on a pixel area. A grayscale voltage may be applied to the first electrode EL1 through the thin film transistor TFT. In one exemplary embodiment, for example, the first electrode EL1 may include a transparent conductive material, such as indium tin oxide ("ITO"), indium zinc oxide ("IZO") and aluminum zinc oxide ("AZO"). In an exemplary embodiment, for example, the first electrode EL1 may have a slit pattern.

The first insulation layer 200 may be disposed on the first electrode EL1. The first insulation layer 200 may be disposed on a whole surface of the base substrate 100. That is, the first insulation layer 200 may cover the black matrix BM and the first electrode EL1.

The black matrix BM may be disposed on the color filter layer CF, therefore the black matrix BM and the color filter layer CF may form a step difference due to the different heights thereof. However, the step difference caused by the different heights of the black matrix BM and the color filter layer CF may be decreased by disposing the first insulation layer 200 thereon.

The first insulation layer 200 may include an organic insulation material or an inorganic insulation material. In one exemplary embodiment, for example, the first insulation layer 200 may include benzocyclobutene polymer, olefin polymer, polyimide polymer, acryl polymer, polyvinyl polymer, siloxane polymer, silicon polymer, etc.

The first insulation layer 200 may cover the black matrix BM and the first electrode EL1. A hole H (see FIG. 4) defined in the first insulation layer 200 may expose the hole H defined in the black matrix BM. The holes may be aligned with each other. That is, the hole H defined in the first insulation layer 200 may be disposed between the gate lines GL.

The first insulation layer 200 may be disposed on the base substrate 100, where the black matrix BM and the first electrode EL1 disposed, that is, overlapping the matrix BM and the first electrode EL1. The first insulation layer 200 may be disposed in an entire surface of the base substrate 100.

In an exemplary embodiment of a method of forming (e.g., providing) a display panel, a mask may be aligned on the base substrate 100 including first insulating layer material, and a light may be radiated onto the mask. The first insulation layer material may be etched by a dry etch process or a wet etch process, to thereby form the hole H in the first insulation layer 200.

The hole H may be defined in the first insulation layer 200, so that a gas generated from a color filter photoresist material for forming the color filter layer CF may be released through the holes H in the black matrix BM and the first insulation layer 200.

The display panel may include the alignment layer 320 to align an image displaying layer 300.

The alignment layer 320 may be disposed between the image displaying layer 300 and the first insulation layer 200. The alignment layer 320 may be disposed between the image displaying layer 300 and the second insulation layer 400. That is, the alignment layer 320 may be disposed on an upper surface of the first insulation layer 200 and in a tunnel-shaped cavity. The alignment layer 320 may be disposed on a lower surface of the second insulation layer 400 in the tunnel-shaped cavity.

The alignment layer 320 pre-tilts liquid crystal molecules in the image displaying layer 300. In an exemplary embodiment of a method of forming (e.g., providing) a display panel, the alignment layer 320 may be formed using an alignment liquid. The alignment liquid may be provided into the tunnel-shaped cavity and then the alignment liquid may be partially removed at room temperature or by heating. The alignment liquid may be a combination of an alignment material, such as polyimide PI, and a solvent.

The alignment liquid is a fluid, and therefore, the alignment liquid may be drawn into the tunnel-shaped cavity due to capillary action. In one exemplary embodiment, for example, the alignment liquid may be provided into the tunnel-shaped cavity through a developer injection hole (not shown).

The alignment liquid may be provided into the tunnel-shaped cavity by using an inkjet process having a micropipette or a vacuum injection apparatus. After providing the alignment liquid, the alignment liquid may be partially removed. The base substrate 100 may be maintained at room temperature or may be heated.

However, the alignment layer 320 may be omitted in accordance with a type of the image displaying layer 300 and/or a structure of the first electrode EL1 and the second electrode EL2. In one exemplary embodiment, for example, when the first electrode EL1 has a micro slit structure, the liquid crystal molecules may be aligned without the alignment layer 320, and thus, the alignment layer 320 may be omitted. Alternatively, when a reactive mesogen layer for the liquid crystal alignment is disposed in the display panel, the alignment layer 320 may be omitted.

The pixel may include the first electrode EL1, the second electrode EL2, and the image displaying layer 300 disposed between the first electrode EL1 and the second electrode EL2.

The image displaying layer 300 may be a liquid crystal ("LC") layer LC. Alternatively, the image displaying layer 300 may be an electrophoresis layer.

In one exemplary embodiment, for example, the image displaying layer 300 may be a liquid crystal layer LC. An alignment of the liquid crystal molecule in the LC layer may be controlled by an electric field applied between the first electrode EL1 and the second electrode EL2. Therefore, a light transmittance of the pixel may be controlled. Alternatively, the image displaying layer 300 may be an electrophoresis layer. The electrophoretic layer may include an insulation medium and charged particles. The insulation medium may include a dispersion medium. The charged particles may include particles having electrophoretic properties. The charged particles are dispersed in the insulation medium. The charged particles may be moved in accordance with an electric field. Therefore, light that is emitted towards the electrophoretic layer may pass through the electrophorectic layer or may be blocked by the charged particles, thus displaying an image.

The second insulation layer 400 may be disposed on the image displaying layer 300. The second insulation layer 400 may include an organic insulation material or an inorganic insulation material. In one exemplary embodiment, for example, the second insulation layer 400 may include benzocyclobutene polymer, olefin polymer, polyimide polymer, acryl polymer, polyvinyl polymer, siloxane polymer, silicon polymer, etc.

The second electrode EL2 may be disposed on the second insulation layer 400. The second electrode EL2 may be insulated from the first electrode EL1 by the first and second insulation layers 200 and 400. The second electrode EL2 may include a transparent conductive material such as ITO or IZO.

The protection layer 500 may be disposed on the second insulation layer 400 and the second electrode EL2. That is, the protection layer 500 may cover the second insulation layer 400 and the second electrode EL2. The protection layer 500 may partially surround the upper surface or a side surface of the image displaying layer 300.

The display panel may further include a first polarizer (not illustrated) and a second polarizer (not illustrated). The first polarizer may be disposed on a lower surface of the base substrate 100. The second polarizer may be disposed on the protection layer 500.

The first polarizer (not illustrated) may be disposed on a lower surface of the base substrate 100. In one exemplary embodiment, for example, the first polarizer may be attached on a lower surface of the base substrate 100. The first polarizer may polarize light provided from a backlight assembly (not illustrated). The first polarizer may have a first polarized axis. The first polarizer may block light not having the first polarized axis.

A second polarizer (not illustrated) may be disposed on the protection layer 500. In one exemplary embodiment, for example, the second polarizer may be attached on an upper surface of the protection layer 500. Alternatively, when the protection layer 500 is omitted, the second protection layer 500 may be attached on the color filter layer CF and the black matrix BM. The second polarizer may polarize light that penetrates the color filter layer CF. The second polarizer may have a second polarized axis. The second polarized axis may be substantially perpendicular to the first polarized axis. The second polarizer may block light not having the second polarized axis.

FIGS. 5A to 5G are cross-sectional views illustrating an exemplary embodiment of a method of manufacturing a display panel in accordance with the invention.

Referring to FIGS. 5A to 5G, steps of forming a color filter layer CF, a black matrix BM and a first insulation layer 200 are illustrated.

In an exemplary embodiment of the invention, a method of manufacturing a display panel includes forming (e.g., providing) a color filter layer CF on a base substrate 100 having a thin-film transistor TFT and a plurality of gate lines GL connected to the thin-film transistor TFT provided thereon, forming a first electrode EL1 on the color filter layer CF, exposing a light on the color filter layer CF, forming a black matrix BM on the color filter layer CF to overlap with the gate lines GL, forming a hole H in the black matrix BM to expose the color filter layer CF, forming a first insulation layer 200 covering the black matrix BM and the first electrode EL1 and forming a hole H in the first insulation layer 200 to expose the hole H in the black matrix BM by a light.

Figure 3:
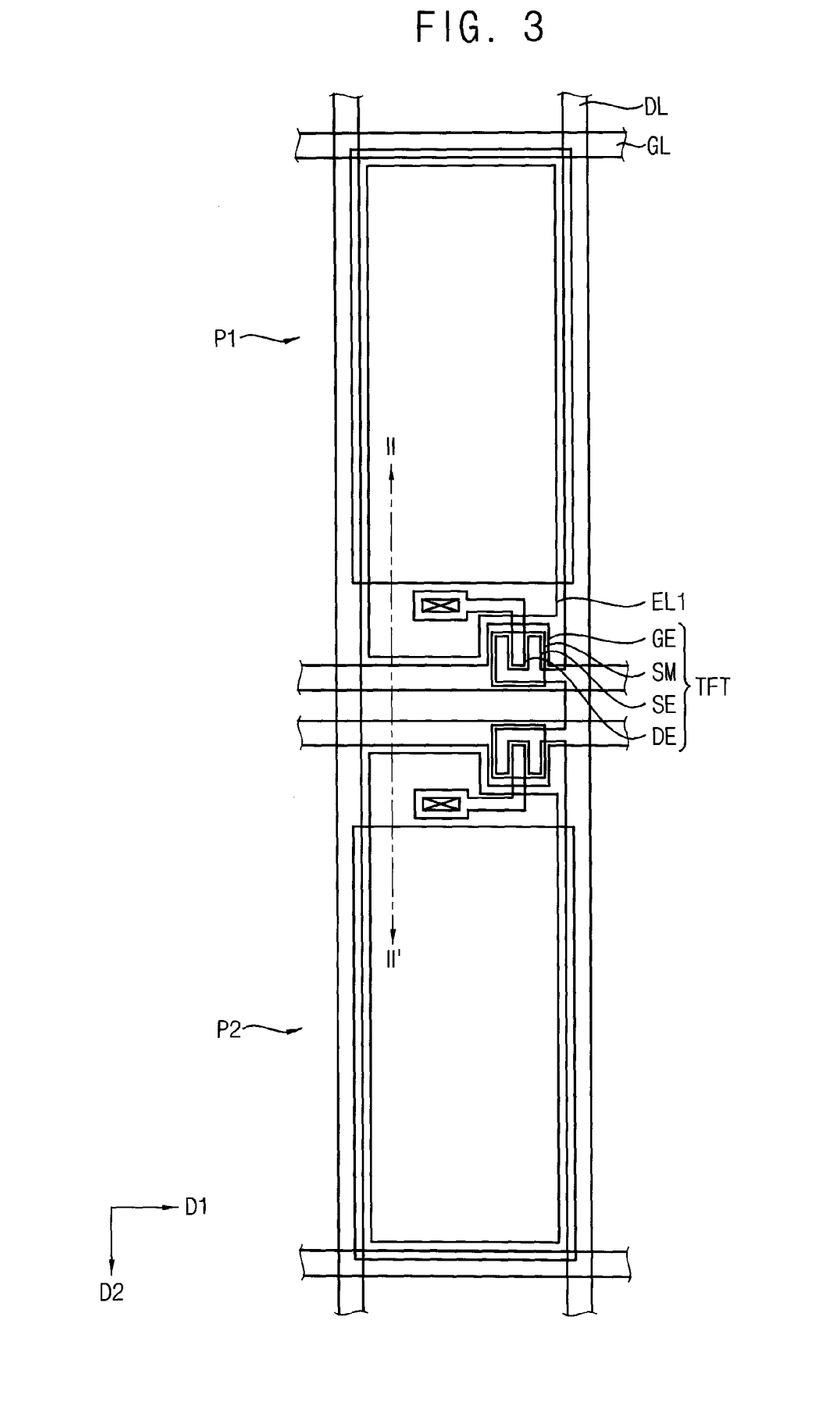
FIG. 3 is a plan view illustrating an exemplary embodiment of a first pixel and a second pixel in the display panel in FIG. 1.
Figure 4:
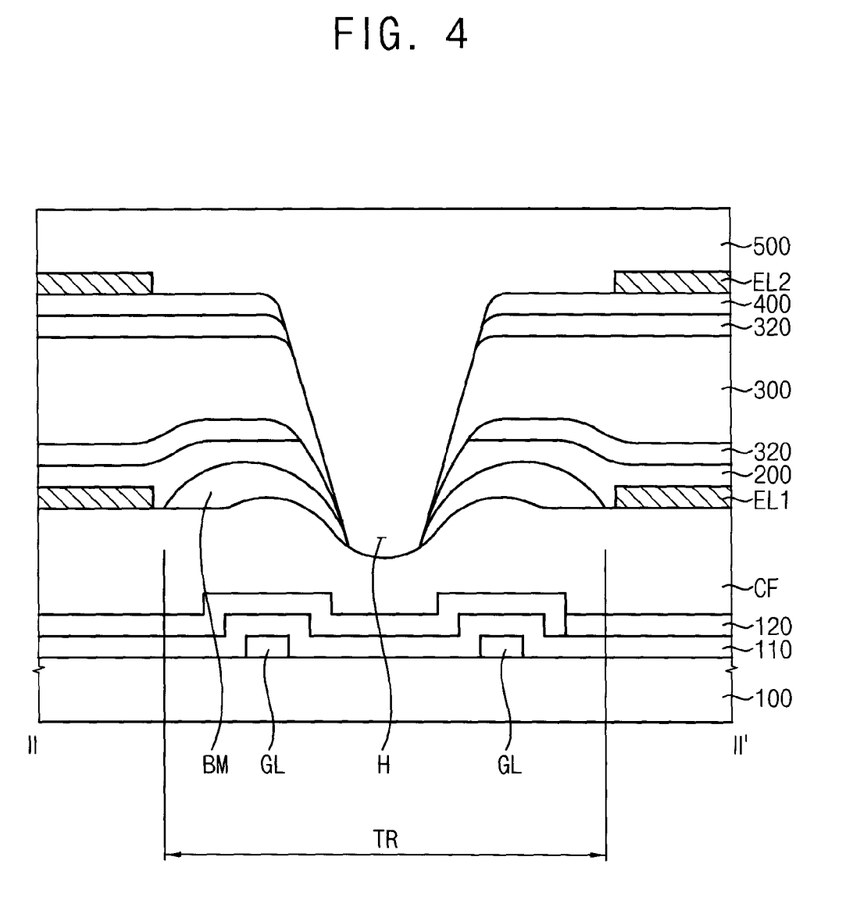
FIG. 4 is a cross-sectional view taken along line II-II' in FIG. 3.
Figure 5A:
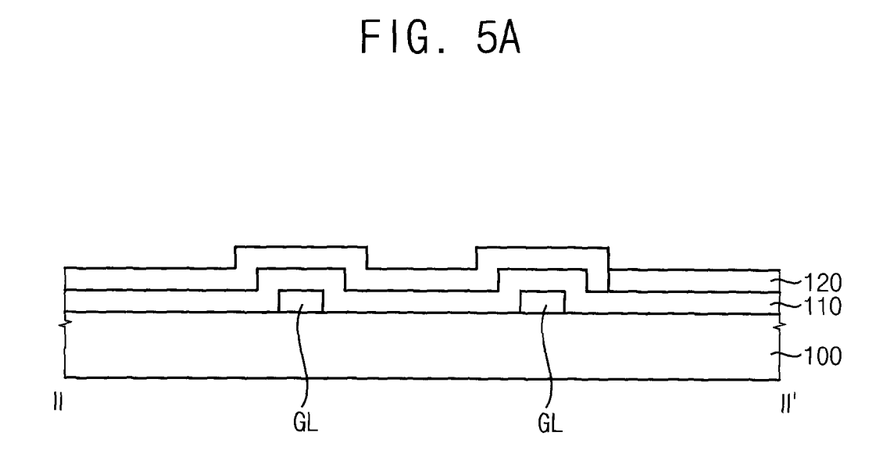
FIGS. 5A to 5G are cross-sectional views illustrating an exemplary embodiment of a method of manufacturing a display panel in accordance with the invention.
Figure 5B:
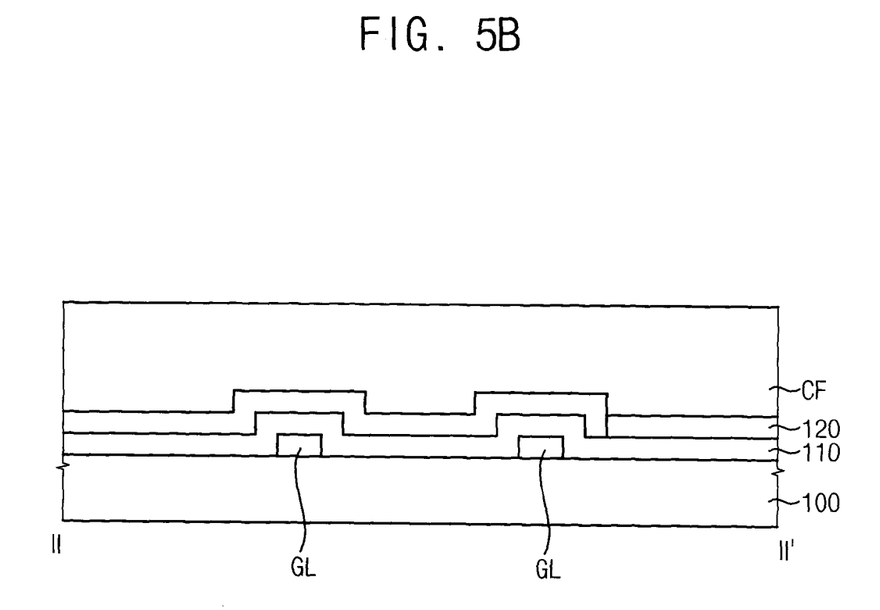

Referring to FIGS. 3, 5A and 5B, a base substrate 100 including a plurality of gate lines GL, a gate insulation layer 110 and a data insulation layer 120 may be provided. A photoresist may be coated on the base substrate 100 having the plurality of gate lines GL, the gate insulation layer 110 and the data insulation layer 120 thereon, to thereby form the color filter layer CF.

A gate pattern including a gate electrode GE and a gate line GL may be formed on the base substrate 100. A first conductive layer may be formed on the base substrate 100 and may be patterned by a photolithography process, thus forming the gate pattern.

The gate insulation layer 110 may be formed on the base substrate 100 to cover the gate pattern. The gate insulation layer 110 may insulate the gate pattern from other elements of the display panel.

A semiconductor pattern SM may be formed on the gate insulation layer 110. The semiconductor pattern SM may overlap the gate electrode GE.

A data pattern including a data line DL, a source electrode SE and a drain electrode DE may be formed on the gate insulation layer 110 on which the semiconductor pattern SM is formed. A second conductive layer may be formed on the insulation layer 110 and may be patterned by a photolithography process, thus forming the data pattern.

The drain electrode DE may be spaced apart from the source electrode SE on the semiconductor pattern SM. The semiconductor pattern SM may have a conductive channel between the source electrode SE and the drain electrode DE.

The thin film transistor TFT may include the gate electrode GE, the source electrode SE, the drain electrode DE and the semiconductor pattern SM.

The data insulation layer 120 may be formed on the gate insulation layer 110 on which the data pattern is formed.

The color filter layer CF may be formed on the data insulation layer 120. The color filter layer CF may include a red color filter, green color filter and a blue color filter. The color filter layer CF may include an organic macromolecular material. The color filter layer CF may be formed by a photolithography process using a photosensitive macromolecular material. Alternatively, the color filter layer CF may be formed by an inkjet process.

Figure 5C:
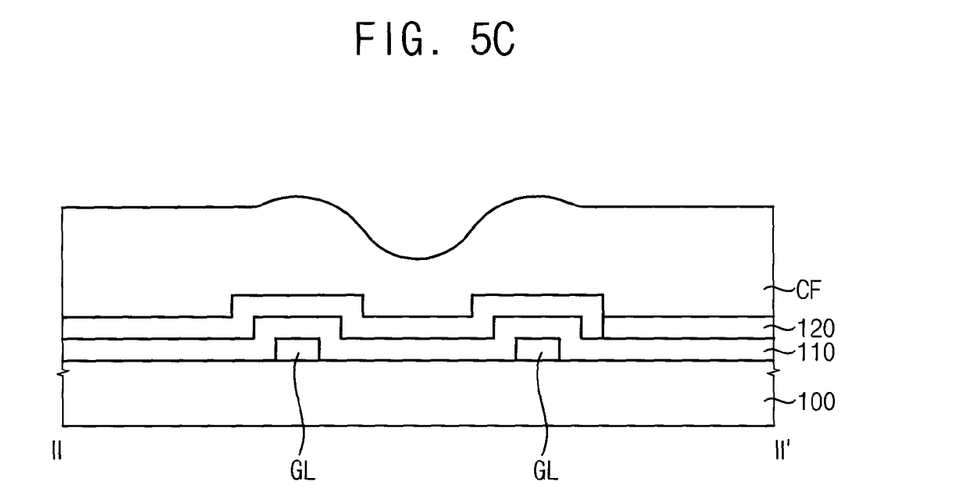

Referring to FIG. 5C, the color filter layer CF may be patterned. The color filter layer CF may be patterned by a halftone mask process or a slit mask process. Thus, a cross-sectional thickness of the area of the color filter layer CF adjacent to the gate lines may be formed to be smaller than a cross-sectional thickness of another area of the color filter layer CF. The smaller thickness area of the color filter layer CF is disposed between adjacent gate lines GL In an exemplary embodiment of the invention, the color filter layer CF may be formed on the trench part TR (see FIG. 4). The gate lines GL may be respectively disposed on opposing sides of the trench part TR, in a second direction D2 of the trench part TR. The second direction D2 is perpendicular to the first direction D1. The color filter layer CF may have a stripe shape in a plan view.

A cross-sectional thickness of an area of the color filter layer CF adjacent to the gate lines GL is smaller than a thickness of another area of the color filter layer CF.

Thus, a gap generated by forming the black matrix BM may be decreased.

The halftone mask may include a blocking area, a non-blocking area and a transflective area (not illustrated in the figures). The blocking area may have a light blocking pattern. The non-blocking area may not have a light blocking pattern. The transflective area may have a transflective pattern to decrease an amount of transmitted light. The halftone mask may be aligned on the photoresist for forming the color filter layer CF, and then, light may be irradiated onto the halftone mask.

Accordingly, while light to the blocking area may be blocked by the light blocking pattern, light to the non-blocking area may pass through the halftone mask. The transflective area having the transflective pattern may decrease an amount of the transmitted light.

The photoresist for forming the color filter layer CF, exposed by the halftone mask may be developed by a developer to form a patterned color filter layer CF.

The blocking area may include chromium Cr or chromium oxide. The transflective area may include substantially the same material as the blocking area. The transflective area may include a slit. The transflective area may include one selected from CrxOy, CrxCoy, CrxCoyNz, SizNy, etc. The one selected from CrxOy, CrxCoy, CrxCoyNz, SizNy, etc. may be disposed on a transparent substrate of the halftone mask. Herein, x, y and z are a positive integer.

A cross-sectional thickness of the color filter layer CF may be controlled by the blocking area, the non-blocking area and the transflective area of the halftone mask.

The slit mask may include a blocking area having a light blocking pattern and a slit area having a slit pattern (not illustrated in the figures). The slit mask may be aligned on the photoresist for forming the color filter layer CF, and then, light may be irradiated onto the slit mask.

The blocking pattern and the slit pattern may include chromium Cr or chromium oxide. Accordingly, while light to the blocking area may be blocked by the light blocking pattern, light to the slit area may pass through the slit pattern to expose the color filter layer CF.

Then, the photoresist material for forming the color filter layer CF, exposed by the slit mask may be developed by a developer to form a patterned color filter layer CF.

The patterns of the mask may be spaced apart by a predetermined interval. Alternatively, the slit pattern may have various types of slit patterns, so that the color filter layer CF may have various shapes. That is, the slit pattern may be formed to have a relatively narrow slit pattern to transmit light. Alternatively, the slit pattern may be formed to have a relatively wide slit pattern to thereby transmit plenty of light.

A shape and a cross-sectional thickness of the color filter layer CF may be controlled by the blocking area and the slit area of the slit mask.

Figure 5D:
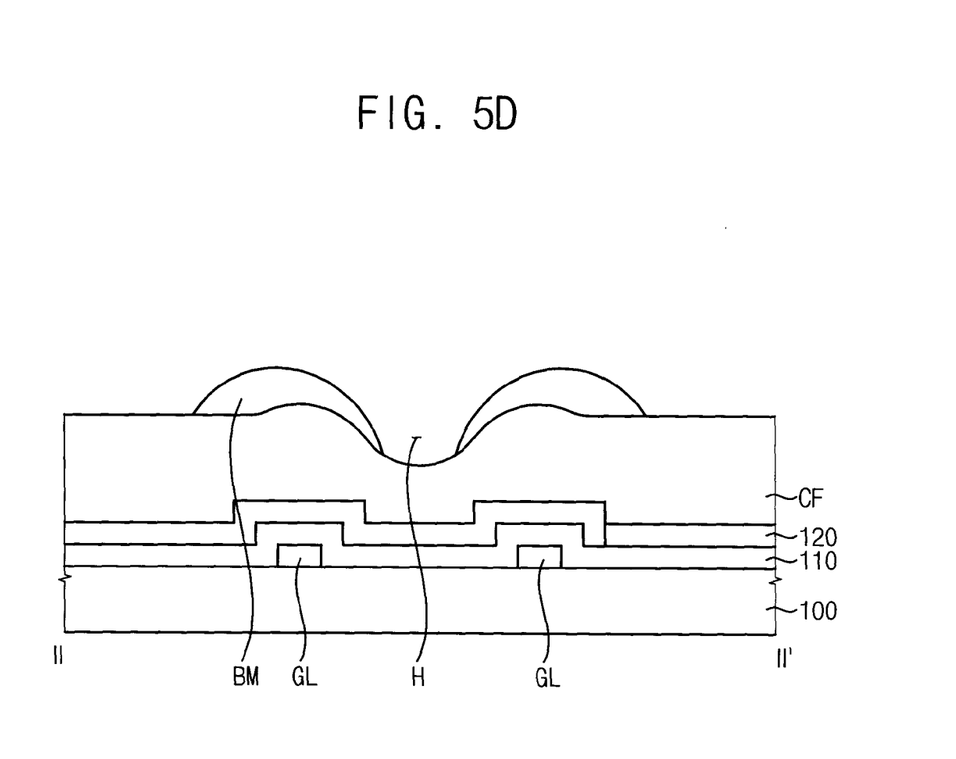

Referring to FIG. 5D, the black matrix BM may be disposed on the color filter layer CF. The black matrix BM may be overlapped with a plurality of the gate lines GL extended to a first direction D1, such as the adjacent gate line GL, to thereby block a light. A hole may be defined in the black matrix BM and disposed between the adjacent ate lines GL. Alternatively, the black matrix BM may be disposed on a non-display area of the pixel area.

The hole H in the black matrix BM may be formed by depositing a black matrix material, irradiating a light using a mask and etching the black matrix material by a dry etch process or a wet etch process.

The black matrix BM may be patterned by a halftone mask process or a slit mask process. Thus, the hole H in the black matrix BM may be disposed between the adjacent gate lines GL.

The halftone mask may include a blocking area, a non-blocking area and a transflective area (not illustrated in the figures). The blocking area may have a light blocking pattern. The non-blocking area may not have a light blocking pattern. The transflective area may have a transflective pattern to decrease an amount of transmitted light. The halftone mask may be aligned on the color filter layer CF, and then, light may be irradiated onto the halftone mask.

Accordingly, while light to the blocking area may be blocked by the light blocking pattern, light to the non-blocking area may pass through the halftone mask. The transflective area having the transflective pattern may decrease an amount of the transmitted light.

The black matrix material for forming the black matrix BM, exposed by the halftone mask may be developed by a developer to form a patterned black matrix BM.

The blocking area may include chromium Cr or chromium oxide. The transflective area may include substantially the same material as the blocking area. The transflective area may include a slit. The transflective area may include one selected from CrxOy, CrxCoy, CrxCoyNz, SizNy, etc. The one selected from CrxOy, CrxCoy, CrxCoyNz, SizNy, etc. may be disposed on a transparent substrate of the halftone mask. Herein, x, y and z are a positive integer.

A cross-sectional thickness of the black matrix BM may be controlled by the blocking area, the non-blocking area and the transflective area of the halftone mask.

The slit mask may include a blocking area having a light blocking pattern and a slit area having a slit pattern (not illustrated in the figures). The slit mask may be aligned on the black matrix material for forming the black matrix BM, and then, light may be irradiated onto the slit mask.

The blocking pattern and the slit pattern may include chromium Cr or chromium oxide. Accordingly, while light to the blocking area may be blocked by the light blocking pattern, light to the slit area may pass through the slit pattern to expose the black matrix material for forming the black matrix BM.

Then, the black matrix material for forming the black matrix BM, exposed by the slit mask may be developed by a developer to form a patterned black matrix BM.

The patterns may be spaced apart by a predetermined interval. Alternatively, the slit pattern may have various types of slit pattern, so that the black matrix BM may have various shapes. That is, the slit pattern may be formed to have a relatively narrow slit pattern to transmit light. Alternatively, the slit pattern may be formed to have a relatively wide slit pattern to thereby transmit plenty of light.

A shape and a cross-sectional thickness of the black matrix BM may be controlled by the blocking area and the slit area of the slit mask.

A hole H in the black matrix BM may have various shapes. In one exemplary embodiment, for example, the hole may be formed in a tetragonal-shape. In one exemplary embodiment, for example, a length of the hole is about 5 μm to about 15 μm, a width of the hole is about 5 μm to about 15 μm.

Holes may be defined in the color filter layer CF and the black matrix BM, so that during forming the color filter layer CF, a gas generated from the color filter photoresist material may be released by the holes.

Figure 5E:
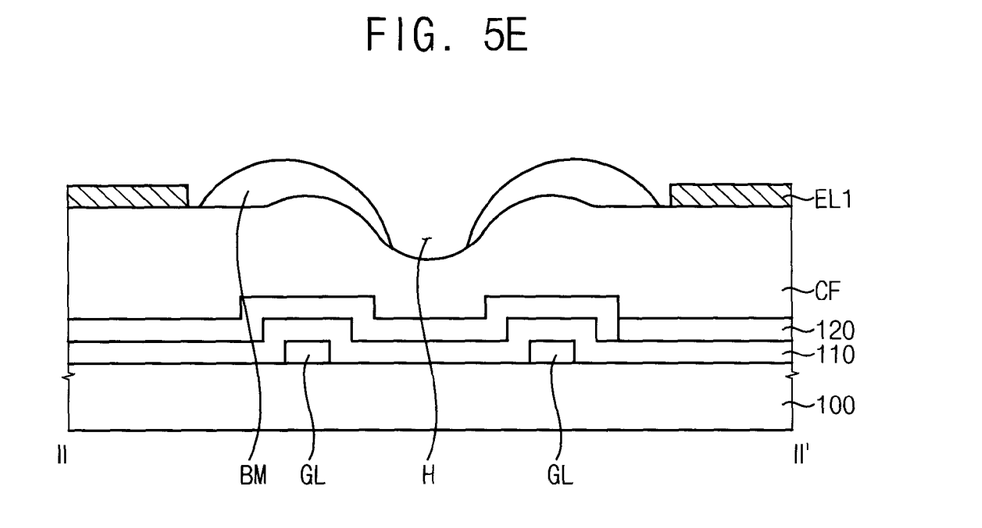

Referring to FIG. 5E, the first electrode EL1 may be disposed on the color filter layer CF. The first electrode EL1 may be disposed on the pixel area.

The first electrode EL1 may have a slit pattern. A first electrode conductive layer may be formed on the color filter layer CF and may be patterned by a photolithography process, thus forming the slit pattern of the first electrode EL1. In one exemplary embodiment, for example, the first electrode EL1 may include a transparent conductive material such as ITO, IZO and AZO.

Figure 5F:
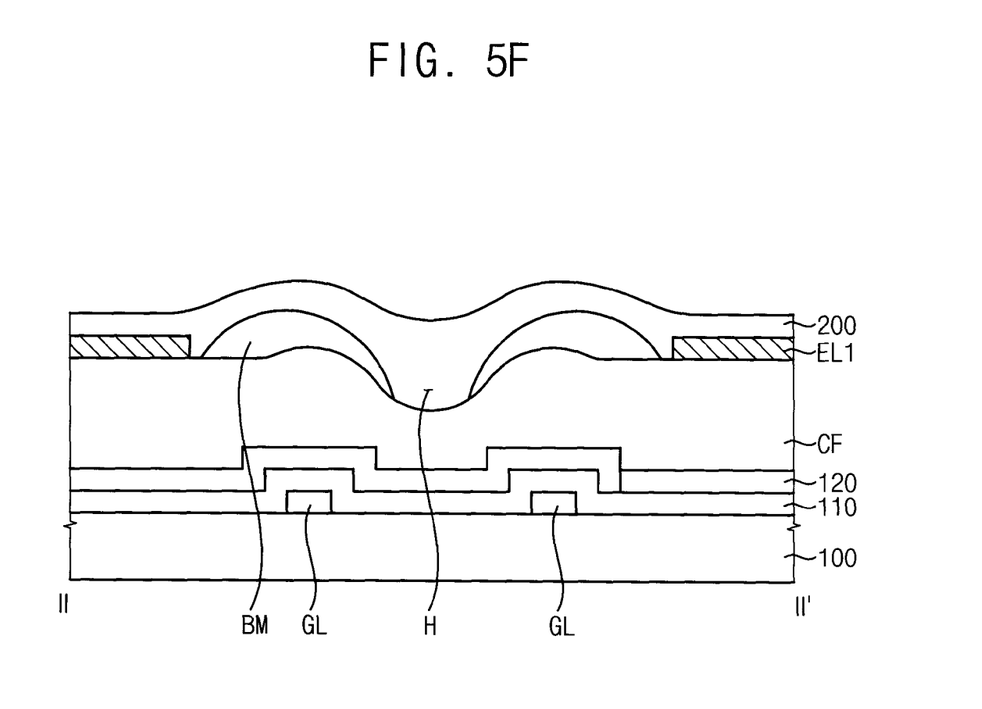

Referring to 5F, a first insulation layer 200 may cover the black matrix BM and the first electrode EL1. The first insulation layer 200 may be formed on an entire surface of the substrate 100.

The first insulation layer 200 may include an organic insulation material or an inorganic insulation material. In one exemplary embodiment, for example, the first insulation layer 200 may include benzocyclobutene polymer, olefin polymer, polyimide polymer, acryl polymer, polyvinyl polymer, siloxane polymer, silicon polymer, etc.

The black matrix BM may be formed on the color filter, therefore the black matrix BM and the color filter layer CF may form a step difference by the different heights thereof. However, the height difference may be decreased by the first insulation layer 200. Therefore, a defect may be decreased during injecting an alignment liquid or a liquid crystal in a subsequent process.

Figure 5G:
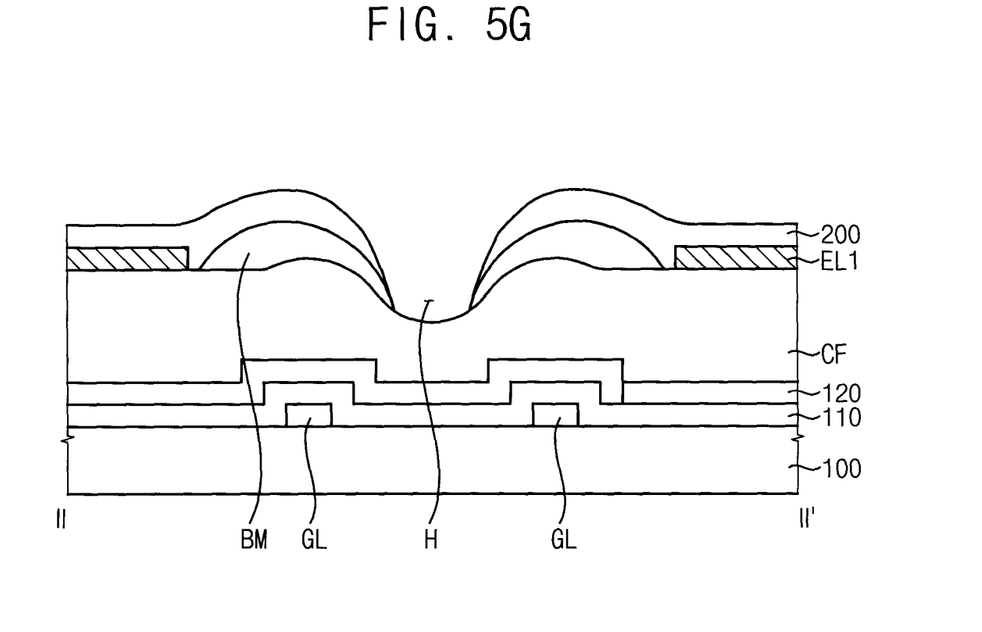

Referring to FIG. 5G, the first insulation layer 200 covering the black matrix BM and the first electrode EL1 may be patterned. Therefore, the first insulation layer 200 may expose the hole H formed in the black matrix BM.

The first insulation layer 200 may be patterned by a halftone mask process or a slit mask process. Therefore, the first insulation layer 200 may expose the hole H in the black matrix BM. The halftone mask and the slit mask according to the exemplary embodiment is substantially the same as the halftone mask and the slit mask for patterning the color filter layer CF or the black matrix BM. Thus, any repetitive explanation concerning the halftone mask and the slit mask will be omitted.

The first insulation material for forming the first insulation layer 200, exposed by the halftone mask or the slit mask may be developed by a developer to form a patterned first insulation layer 200.

A shape and a cross-sectional thickness of the first insulation layer 200 may be controlled by the blocking area, the non-blocking area and the transflective area of the halftone mask. Alternatively, a shape and a cross-sectional thickness of the first insulation layer 200 may be controlled by the blocking area and the slit area of the slit mask.

In accordance with an exemplary embodiment of the invention, a sacrificial layer (not illustrated) is formed on the base substrate 100.

A photoresist composition may be coated on the first insulation layer 200, thus forming the sacrificial layer (not illustrated). The sacrificial layer may correspond to the pixel area.

The sacrificial layer may be partially removed, providing a space defining a tunnel-shaped cavity. Accordingly, the sacrificial layer may be formed at a position, where the image displaying layer is to be formed. The sacrificial layer may determine a width and height of the tunnel-shaped cavity.

The sacrificial layer may be formed by coating a photoresist composition. The photoresist composition may include a positive photoresist. The positive photoresist may be an organic material including, e.g., a novolak resin. In one exemplary embodiment, for example, the sacrificial layer may include a positive novolak photoresist. The sacrificial layer may be formed by deposition and ashing processes or by deposition and polishing processes. Alternatively, the sacrificial layer may be formed by an inkjet process or a spin-coating process.

Referring to FIG. 2 and FIG. 4, in accordance with an exemplary embodiment of the invention, a second insulation layer 400 may be formed on the sacrificial layer. A second electrode EL2 may be formed on the second insulation layer 400.

The second insulation layer 400 may include an organic insulation material or an inorganic insulation material. In one exemplary embodiment, for example, the second insulation layer 400 may include benzocyclobutene polymer, olefin polymer, polyimide polymer, acryl polymer, polyvinyl polymer, siloxane polymer, silicon polymer, etc.

In accordance with an exemplary embodiment of the invention, the second electrode EL2 may be arranged corresponding to a pixel area (not illustrated in the figures). The second electrode EL2 may include a transparent conductive material such as ITO and IZO.

In accordance with an exemplary embodiment of the invention, the sacrificial layer may be partially removed. An alignment layer 320 may be formed by an alignment liquid.

In accordance with an exemplary embodiment of the invention, before removing the sacrificial layer, a developer injection region may be formed on the sacrificial layer.

A photoresist composition may be coated on the second insulation layer 400, where the second electrode EL2 is formed. The photoresist composition might not be formed on a position corresponding to a developer injection region that is used as a pathway for removing the sacrificial layer. Therefore, the photoresist composition may expose a portion of the second insulation layer 400 between pixel areas adjacent to each other.

The exposed portion of the second insulation layer 400 may be partially removed by an etching process. The photoresist composition may function as a mask, and the partially exposed portion of the second insulation layer 400 may be etched corresponding to the developer injection region.

The photoresist composition and the sacrificial layer may be exposed to a light. The photoresist composition including a negative photoresist is hardened by the light exposure.

The second electrode EL2 and the second insulation layer 400 are transparent, to thereby allow penetration of the light and the light may reach the sacrificial layer. Thus, the sacrificial layer including a positive photoresist may be dissolved and transformed by the light exposure and may be removed by a developing process. The intensity of light used for the light exposure may be in a range from about 300 millijoules (mJ) to about 3 joules (J). The wavelength of the light may be about 365 nanometers (nm).

A developer may be injected to the sacrificial layer through the developer injection hole. The developer eliminates the sacrificial layer. The sacrificial layer may be easily removed by the developer because the sacrificial layer is previously transformed by the light exposure. A tunnel-shaped cavity may be formed by removing the sacrificial layer by developer. The tunnel-shaped cavity may be formed at a space where the sacrificial layer is removed. Referring to FIG. 2, the tunnel-shaped cavity may be defined between the first and second insulating layers 200 and 400, where the image displaying layer 300 is indicated.

The developer may include an alkali solution. For example, the developer may include about 90% or more of water and 10% or less of an alkali component. The developer only removes the sacrificial layer. In one exemplary embodiment, for example, the developer may include about 2.38% of tetramethylammonium hydroxide ("TMAH") or about 1% of potassium hydroxide (KOH).

The removal of the sacrificial layer by the developer may be performed at about 23 degrees Celsius (° C.) to about 26° C. The removal of the sacrificial layer may be accelerated by increasing the processing temperature. In one exemplary embodiment, for example, the sacrificial layer may be removed by the developer at about 23° C. to about 80° C.

In accordance with an exemplary embodiment of the invention, an alignment layer 320 is formed by an alignment liquid.

The alignment layer 320 may be formed in the tunnel-shaped cavity that is obtained by removing the sacrificial layer. The alignment layer 320 may be disposed in the tunnel-shaped cavity on an upper surface of the first insulation layer 200 and the first electrode EL1. The alignment layer 320 may be disposed in the tunnel-shaped cavity on a lower surface of the second insulation layer 400 and the second electrode EL2. The alignment layer 320 may be formed by an alignment liquid. The alignment liquid may be obtained by a combination of an alignment material such as polyimide (PI) and a solvent. The alignment liquid may flow into the tunnel-shaped cavity by capillary action. In one exemplary embodiment, for example, the alignment liquid may be provided into the tunnel-shaped cavity through a developer injection hole (not shown).

The alignment liquid may be provided into the tunnel-shaped cavity by using an inkjet having a micropipette or using a vacuum injection apparatus. The solvent may be removed from the alignment liquid by leaving the base substrate 100 at room temperature or by heating the base substrate 100.

However, the alignment layer may 320 be omitted in accordance with the type of the image displaying layer 300 and/or the structure of the first electrode EL1 and the second electrode EL2. In one exemplary embodiment, for example, when the first electrode EL1 has a particular shape, and thus, the liquid crystal molecules of the image displaying layer 300 may be aligned without the alignment layer 320, the alignment layer 320 may be omitted.

In accordance with an exemplary embodiment of the invention, the image displaying layer 300 may be formed in the tunnel-shaped cavity in which the alignment layer 320 is formed. The image displaying layer 300 may be a liquid crystal layer including a liquid crystal. The liquid crystal is provided as a fluid. The liquid crystal may flow into the tunnel-shaped cavity by capillary action. In one exemplary embodiment, for example, the liquid crystal may be provided into the tunnel-shaped cavity through a developer injection hole (not shown).

The liquid crystal may be provided into the tunnel-shaped cavity by using an inkjet having a micropipette. Alternatively, the liquid crystal may be provided into the tunnel-shaped cavity by using a vacuum injection apparatus. When using the vacuum injection apparatus, the developer injection hole may be immersed in the chamber including a liquid crystal material. When the pressure of the chamber decreases, the liquid crystal may be drawn into the tunnel-shaped cavity by capillary action.

In an exemplary embodiment of the invention, instead of the liquid crystal layer, the display panel may include an alternative image displaying layer 300 displaying an image. In one exemplary embodiment, for example, the image displaying layer 300 may be an electrophoretic layer. The electrophoretic layer may include an insulation medium and charged particles. The insulation medium may be a dispersion medium. The charged particles have electrophoretic properties.

In accordance with one or more exemplary embodiment of the invention, an embedded micro-cavity display panel includes a hole in various layers thereof to expose the color filter layer, so that an aperture ratio of the display panel may be maintained, and poor performing pixels may be decreased. Thus, the embedded micro-cavity display panel may apply to a display panel and a display apparatus having the same.

Although exemplary embodiments of the invention have been described, it is understood that the invention should not be limited to these exemplary embodiments and various changes and modifications can be made by one of those ordinary skilled in the art within the spirit and scope of the invention as hereinafter claimed.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display panel comprising:
    a substrate comprising a plurality of thin-film transistors disposed thereon;
    a plurality of gate lines disposed on the substrate and respectively connected to a thin film transistor;
    a color filter layer disposed on the gate lines and on the substrate;
    a black matrix disposed on the color filter layer and overlapping the gate lines, and a hole defined in the black matrix and exposing the color filter layer;
    a first electrode disposed on the color filter layer and electrically connected to the thin-film transistor; and
    an image displaying layer disposed on the first electrode.

2. The display panel of claim 1, further comprising a first insulation layer covering the black matrix and the first electrode, and exposing the hole defined in the black matrix.

3. The display panel of claim 2, further comprising:
    a second insulation layer disposed on the image displaying layer; and
    a second electrode disposed on the second insulation layer and insulated from the first electrode.

4. The display panel of claim 3, wherein the first insulation layer and the second insulation layer comprise an organic insulation material.

5. The display panel of claim 3, further comprising a protection layer disposed on the second electrode, and surrounding a portion of an upper surface and a side surface of the image displaying layer.

6. The display panel of claim 5, further comprising an upper polarizer disposed on an upper surface of the protection layer, and a lower polarizer disposed on a lower surface of the substrate.

7. The display panel of the claim 3, wherein the image displaying layer comprises:
a liquid crystal layer comprising a liquid crystal, and
an alignment layer disposed between the first insulation layer and the liquid crystal layer, and between the second insulation layer and the liquid crystal layer.

8. The display panel of claim 1, wherein the hole defined in the black matrix is arranged between the gate lines.

9. The display panel of claim 1, wherein the hole defined in the black matrix has a tetragonal shape.

10. The display panel of claim 8, wherein
a length of the hole is about 5 micrometers to about 15 micrometers, and
a width of the hole is about 5 micrometers to about 15 micrometers.

11. The display panel of claim 1, wherein a cross-sectional thickness of an area of the color filter layer overlapping the hole defined in the black matrix is smaller than a cross-sectional thickness of another area of the color filter layer.

12. A method of manufacturing a display panel, comprising:
providing a substrate comprising: a plurality of thin-film transistors disposed thereon, and a plurality of gate lines disposed thereon and respectively connected to a thin-film transistor;
forming a color filter layer on the substrate;
exposing the color filter layer to a first light; and
forming a black matrix on the color filter layer and overlapping the gate lines, and forming a hole in the black matrix to expose the color filter layer.

13. The method of claim 12, further comprising forming a first electrode on the color filter layer.

14. The method of claim 13, further comprising:
forming a first insulation layer covering the black matrix and the first electrode; and
exposing the first insulation layer to a second light such that the first insulation layer exposes the hole defined in the black matrix.

15. The method of claim 14, further comprising:
after the exposing the first insulation layer, forming a sacrificial layer on the first insulation layer by coating a first photoresist composition;
forming a second insulation layer on the sacrificial layer;
forming a second electrode on the second insulation layer;
removing the sacrificial layer by a developer to define a space; and
forming an image displaying layer in the space from which the sacrificial layer is removed.

16. The method of claim 15, further comprising forming a developer injection hole which exposes the sacrificial layer, before the removing the sacrificial layer,
wherein forming the developer injection hole comprises:
coating a second photoresist composition on the second electrode, and etching an exposed portion of the second insulation layer using the second photoresist composition as a mask to expose the sacrificial layer.

17. The method of claim 15, wherein the forming the image displaying layer comprises:
forming an alignment layer in the space from which the sacrificial layer is removed; and
injecting a liquid crystal into the space comprising the alignment layer formed therein.

18. The method of claim 15, further comprising forming a protection layer disposed on the second electrode, and surrounding a portion of an upper surface and a side surface of the image displaying layer.

19. The method of claim 14, wherein the first insulation layer comprises an organic insulation material.

20. The method of claim 12, wherein
the hole defined in the black matrix has a tetragonal shape,
a length of the hole is about 5 micrometers to about 15 micrometers, and
a width of the hole is about 5 micrometers to about 15 micrometers.

* * * * *